J. C. WILSON.
COMPUTING TIME STAMP.
APPLICATION FILED SEPT. 8, 1903.

1,008,763.

Patented Nov. 14, 1911.

J. C. WILSON.
COMPUTING TIME STAMP.
APPLICATION FILED SEPT. 8, 1903.

1,008,763.

Patented Nov. 14, 1911.
6 SHEETS—SHEET 6.

Witnesses:
But E Kemp
A. L. Moser

Inventor:
John C. Wilson
By J. H. Huff
Atty

UNITED STATES PATENT OFFICE.

JOHN C. WILSON, OF BOSTON, MASSACHUSETTS.

COMPUTING TIME-STAMP.

1,008,763. Specification of Letters Patent. Patented Nov. 14, 1911.

Application filed September 8, 1903. Serial No. 172,259.

*To all whom it may concern:*

Be it known that I, JOHN C. WILSON, of Boston, in the county of Suffolk and State of Massachusetts, have invented certain new and useful Improvements in Computing Time-Stamps, of which the following is a specification.

My invention relates to improvements in time printing machines commonly known as time stamps.

The apparatus consists of a novel arrangement of parts and connecting and coöperating devices to enable such machines to not only print or record the actual times of day and the date when the machine is operated, but also to automatically compute or calculate and record or indicate the exact amount or value of the time which may elapse or intervene between two or more successive imprintings to the exact second if need be, and it is particularly adapted for use in connection with telephone toll lines switchboards to record the exact time when a toll line conversation begins and when it ends and at the same time to automatically compute or calculate and record the exact elapsed or intervening time, or to indicate that the elapsed or intervening time has not exceeded a certain fixed or predetermined period or time limit.

My invention consists of certain novel features hereinafter described and particularly pointed out in the claims.

In carrying out my invention I utilize the devices for printing and recording time shown and described in three U. S. patents granted to me, viz: No. 527,918, October 23, 1894; No. 576,644 February 9, 1897, and No. 637,315 November 21, 1899, to which reference may be had.

In the accompanying drawings which illustrate a construction embodying my invention, Fig. 10 is a view of the second printing device in side elevation. Fig. 15ª is a perspective view of the main operating or imprinting lever or handle from the rear, showing the slot and pivot hole through its inner end. Fig. 26 is a top plan view of the meridial changing device mounted upon a part of the clock time train plate. Fig. 30 is a facsimile of two superimposed imprints made by the machine eighteen seconds apart, showing the hour, minute and second of the first and second imprints, and indicating that the predetermined initial time limit or period has not been exceeded. Fig. 31 is a side elevation of the retaining screw pin for the meridian or a. m.—p. m. printing part.

Like letters of reference refer to like parts throughout the several views.

As shown in Figs. 1, 2, 3 and 14,—the machine is divided into an upper and a lower portion, the upper portion consisting of a rectangular case or box A, containing the clock, and carrying the printing dies and the inking ribbon with its feeding devices, while the lower portion comprises the base plate B (Figs. 1, 2, 3, 12, 13 and 15) which carries and supports the imprinting devices and accessories, and these two portions of the machine are joined together by the screw bolts $b$, $b'$, $b^2$ and $b^3$, passing through the flanges $b^4$, $b^5$, $b^6$ and $b^7$ in the upper portion and being screwed into corresponding screw-threaded holes (not shown) in the base plate B of the lower portion of the machine.

The clock C is a time train of usual construction (Fig. 3) and it is suspended in the case A by the dial plate C' resting on four studs or projections (one of which $C^2$ is shown) on the inner edge of the case A and near the top of the same, and it is fastened in the case A by screws (not shown) passing through the said clock dial C' and being screwed into screw threads in the said studs or projections, the hour and minute change wheels mounted in the usual way and being placed between the dial plate C' and the upper clock plate $C^3$ for the visible hands $c'$, $c^2$ and $c^3$ and upon the lower clock plate $C^4$ of the clock C for the hour and minute printing parts or hands.

Figure 1:
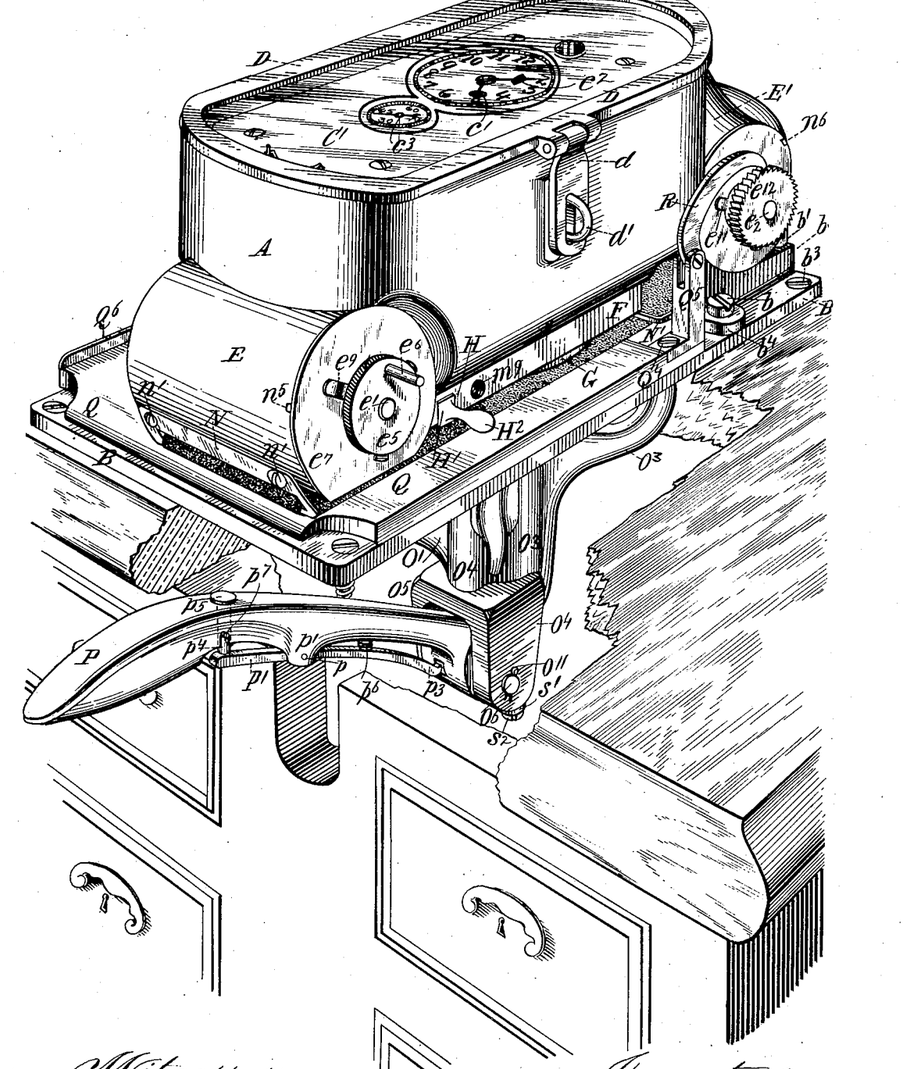
Figure 1 is a perspective view of the machine from the right side, the desk upon which it is mounted being broken away to expose the main operating or imprinting lever or handle below the machine, and the auxiliary lever connected therewith.
Figure 2:
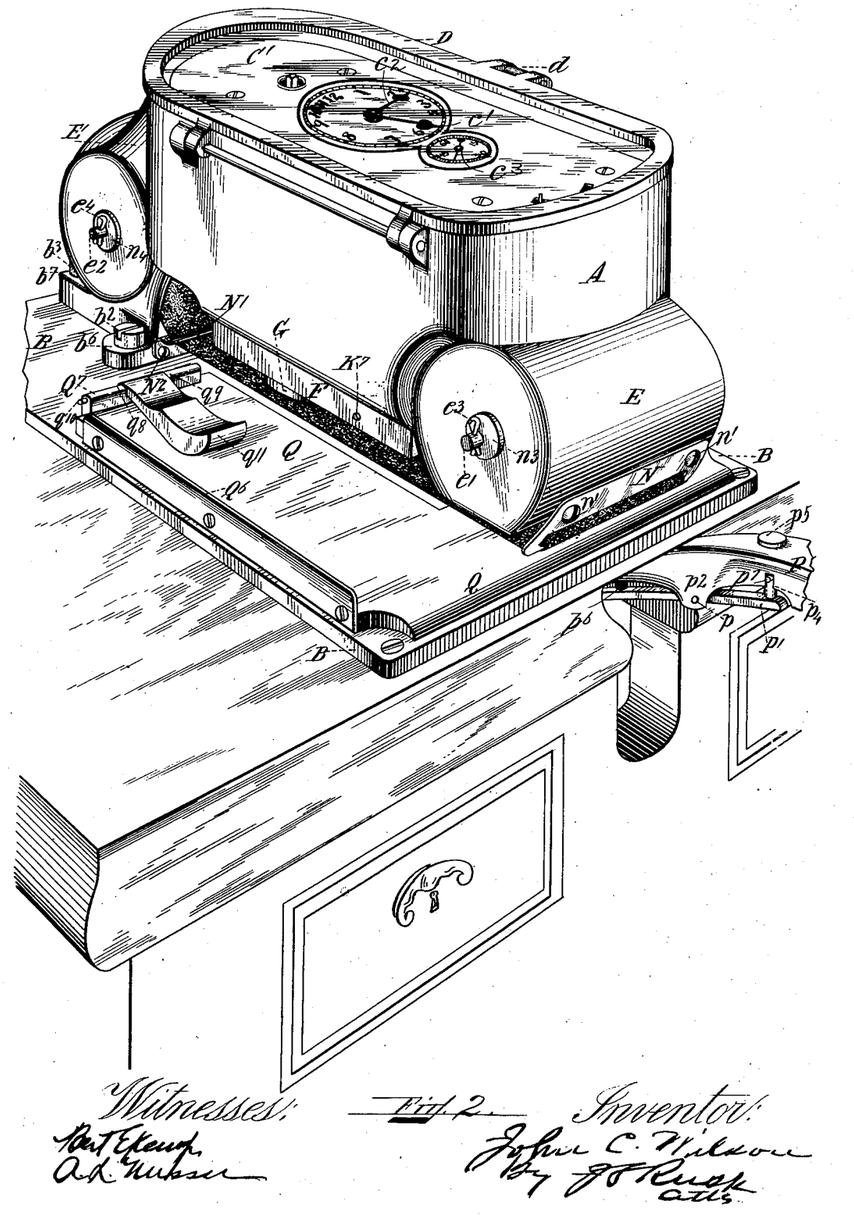
Fig. 2 is a perspective view of the machine from the left side, the front portions of the main operating or imprinting lever or handle and the auxiliary lever protruding from underneath being shown as broken off.
Figures 3, 4, 6, 7, 8, 9, 11:
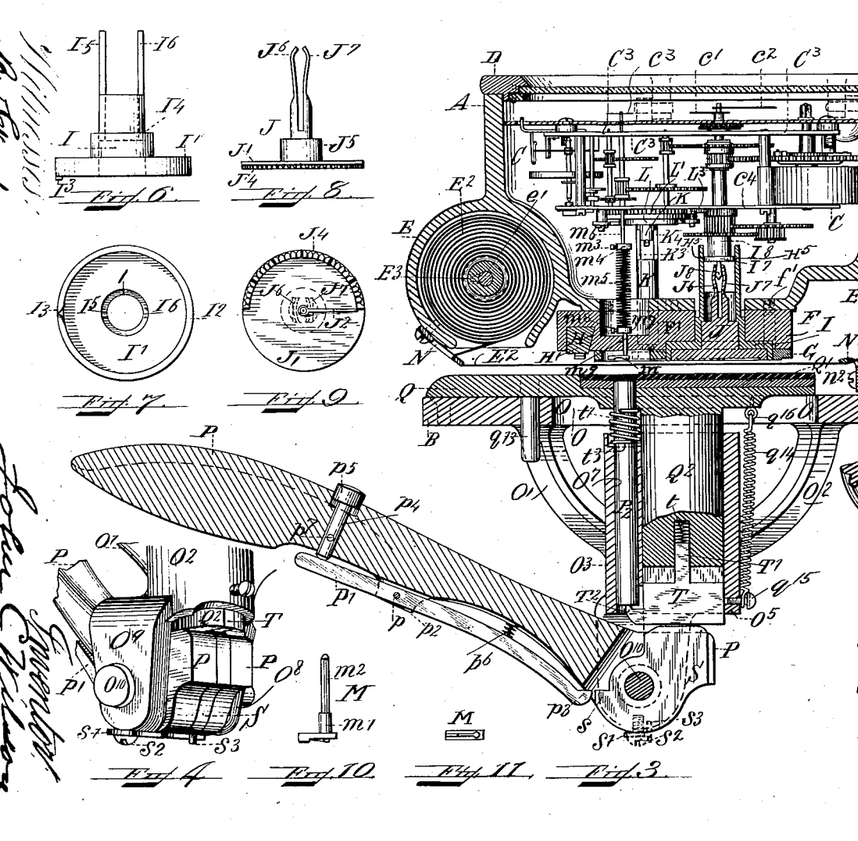
Fig. 3 is a longitudinal vertical section of the machine mounted upon a desk showing the main operating or imprinting lever or handle and its connecting auxiliary lever, together with their coöperating parts in their normal position.
Fig. 4 is a side elevation in perspective of the inner portions of the main operating or imprinting lever or handle and the connected auxiliary lever underneath the same, and their coöperating and supporting parts.
Fig. 6 is a side elevation of the hour printing device.
Fig. 7 is a plan view of the same.
Fig. 8 is a side elevation of the minute printing and computing or calculating device.
Fig. 9 is a plan view of the same.
Fig. 11 is a plan view of the printing surface of the second printing device.
Figure 5:
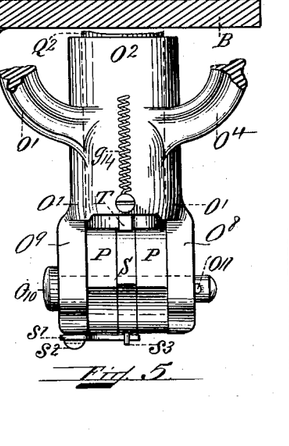
Fig. 5 is a front elevation of the same parts shown in Fig. 4.
Figure 12:
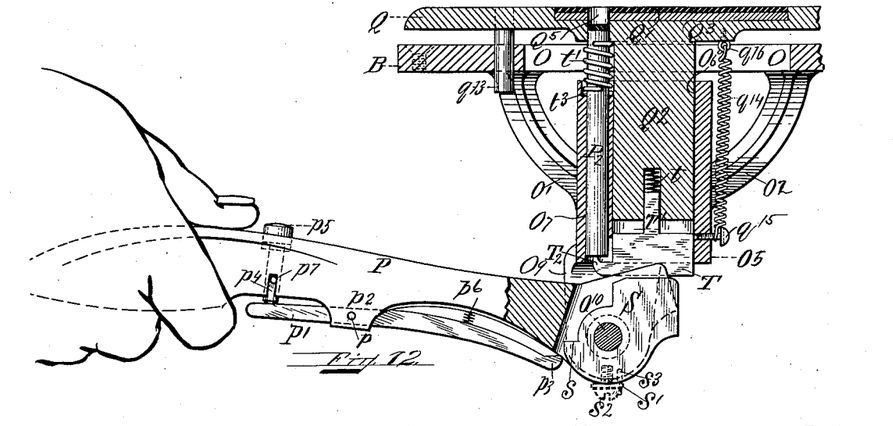
Fig. 12 is a longitudinal vertical section showing part of the base plate of the machine, the main operating lever or handle being depressed and the connected auxiliary lever being in the normal or disengaged position, while the platen frame or carrier together with its attached main plunger are shown in the elevated or imprinting position, the auxiliary plunger or plug being represented in its normal or unelevated position.
Figure 13:
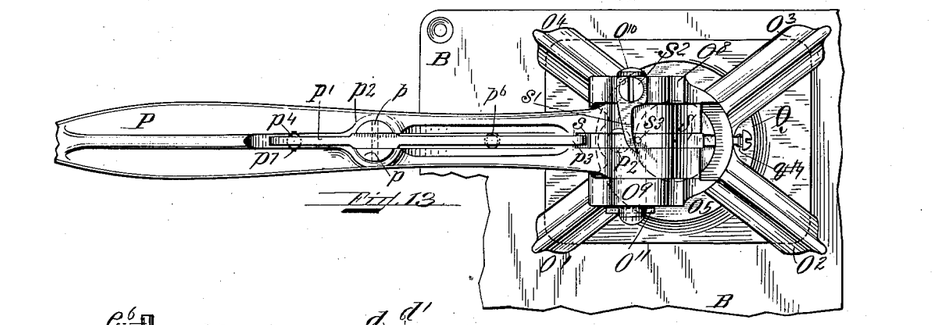
Fig. 13 is a plan view of the machine from underneath showing part of the base plate and the tubular socket for the main plunger connected therewith by the four downwardly extending curved arms or spider, together with the main operating or imprinting lever or handle its pivot and support and its connected auxiliary lever.
Figure 14:
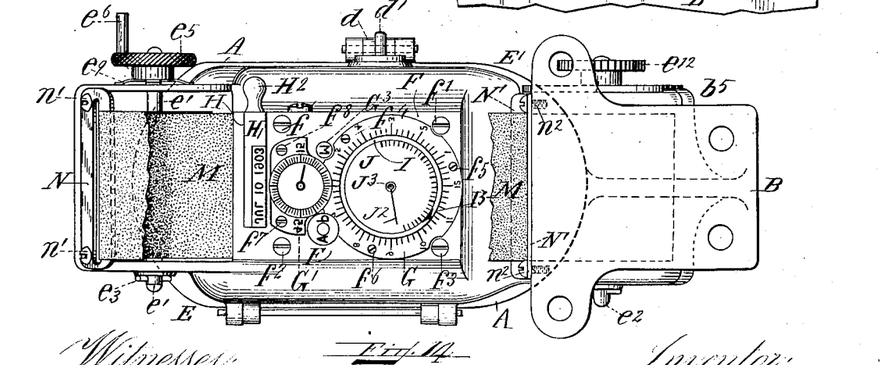
Fig. 14 is a plan view of the under side of the upper portion of the machine showing a partial view of the devices for feeding the ink ribbon and a complete view of the printing surfaces.
Figure 23:
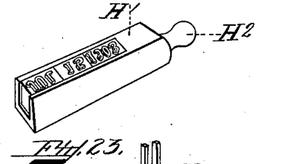
Fig. 23 is a perspective view of the type carrier or holder and the dating types in position therein.

To the top of the case A a bezel or lid D is hinged provided with a glass through which the clock dial C' and the hands $c'$, $c^2$ and $c^3$ may be seen, and it may be locked to the case A by means of the hasp $d$ and the staple $d'$. To the bottom of the case A is fastened the bedplate F by the screws $f$, $f'$, $f^2$ and $f^3$ (Fig. 14) passing through the said bed-plate F and being screwed into screw-threaded holes (not shown) in the case A. To the lower surface of the bed-plate F the graduated hour and minute clock dial printing die G is attached by the screws $f^4$, $f^5$ and $f^6$ passing through the said clock dial printing die G and being screwed into screw-threaded holes (not shown) in the bed-plate F, and in the same way the graduated second printing clock dial G' is attached to the bed-plate F by the screws $f^7$ and $f^8$. The "M" printing die $G^3$ is firmly fastened in the proper printing position in the bed-plate F as shown in Fig. 14, by being driven into a hole in the bed-plate F slightly smaller than itself in circumference. Into the slot or groove H in the bed-plate F, Figs. 1, 3 and 14, the type holder or carrier H', Fig. 23, carrying or holding the required date printing types may be easily inserted or removed, the slot or groove H in the bed-plate F and the slot in the type-holder or carrier H' being wider at the top than at the bottom and the date printing types being wider across their bases than they are at their printing surfaces, the type-carrier or holder H' is firmly held in the slot or groove H in the bed-plate F and the type dates cannot fall out of the carrier or holder H' and in order to prevent undue sagging of the type in the carrier or holder H' when they are in the printing position, one side of the carrier or holder H' is made slightly flexible or yielding, the other two sides being rigid. The type carrier or holder H' is also provided with a small handle $H^2$ (Figs. 1, 14 and 23) to facilitate its insertion into and removal from the slot or groove H in the bed-plate F. The hour printing part I (Figs. 6, 7 and 14) consists of a disk $I'$ having a narrow ring or rim $I^2$ around its periphery extending slightly below its lower surface. Upon this ring or rim an arrow-head or small triangle $I^3$ representing the hour hand is formed or engraved. Extending through the center of said disk $I'$ is a hollow shouldered hub $I^4$ fitted with two legs or projections $I^5$, $I^6$ adapted to fit into the corresponding slot $H^5$ (Fig. 3) in the disk $I^7$ which is attached to the hour wheel of the clock C by the sleeve $I^8$ (Fig. 3). The minute printing and time computing or calculating part J (Figs. 8, 9 and 14) consists of a flat disk $J'$ having a straight line $J^2$ and a center $J^3$ formed or engraved upon its lower surface representing the minute hand, the said straight line extending from near the outer edge of the disk $J'$ to the center $J^3$ and a series of graduations $J^4$ near the outer edge of the disk $J'$ beginning in proximity to the straight line $J^2$ and extending over a portion of its circumference, the graduations being shown in this instance as spaced into minute and five minute divisions, and when taken together with the straight line $J^2$ and the center $J^3$ representing the minute hand being plotted over one-half of the circumference of the disk J. The upper surface of the minute printing and time calculating or computing part J is provided with a central shoulder $J^5$ to which is attached two projecting springs $J^6$ and $J^7$, the extremities of which are curved reversely so as to cause the outer edges of the ends of the springs $J^6$ and $J^7$ to be closer together than their central portions in order to positively clutch the prism-shaped center or minute arbor $J^8$ of the clock train C and when clutched to prevent it from moving sidewise out of its proper position.

As shown in Figs. 3 and 14, when the hour and minute printing parts I and J are in operative position, they are in concentric relation with the clock dial die G and they extend through a hole in the bed-plate F, the upper surface of the hour-printing part I bearing lightly upon the lower surface of the countersunk chamber $F'$ in the bed plate F and the upper surface of the minute-printing part J bearing lightly upon the lower surface of the hour printing part I, the shoulder or stem $J^5$ of the former with its clutching springs $J^6$ $J^7$ extending through the hollow hub $I^4$ of the latter, the clutching springs $J^6$ and $J^7$ coöperating with the prism-shaped end of the center arbor $J^8$ of the clock C to support both the hour and minute printing parts I and J in rotative connection with the clock train C.

Figure 24:
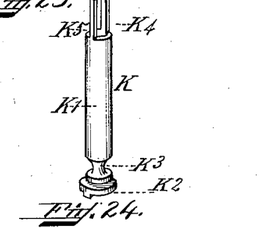
Fig. 24 is a perspective view of the meridian printing part and Fig. 25 is a top plan view of the printing surface of the same.
Figure 25:
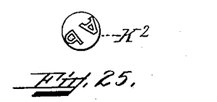
Figure 27:
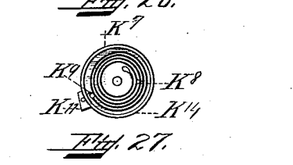
Fig. 27 is a plan view of the under side of the barrel and actuating coiled spring of the meridian or a. m.—p. m. changing device.

The meridian or a. m.—p. m. printing part K (Figs. 3, 24 and 25,) consists of a cylindrical stem $K'$ provided at its lower end with a disk $K^2$ having the letters "A—P" engraved upon its surface in printing form and having a groove $K^3$ around the stem $K'$ near the disk $K^2$, and it is also provided with two legs or projections $K^4$ and $K^5$ at its upper extremity which fit into the slot $K^6$ in the barrel $K^7$ of the meridian or a. m.—p. m. changing device of the clock C (Figs. 3 and 26), the meridian printing part K when in operative position extending through a hole in the bed plate F and being held in its proper position by the point of the retaining screw pin $K^8$ (Figs. 2 and 31) engaging with the groove $K^3$ of the meridian or a. m.—p. m. printing part, the retaining screw pin $K^8$ (Fig. 31) being kept in position by the screw threads on its head coöperating with corresponding screw threads in the screw-hole which extends inwardly through the side of the bed-plate F.

The meridian or a. m.—p. m. changing device L (Figs. 3 and 26) is mounted upon the lower inclosing plate $C^4$ of the clock train C and consists of a ratchet wheel $L'$ revolving on a stud on the clock plate $C^4$. The ratchet wheel $L'$ has twenty-four teeth, and coöperates with a retaining pawl $L^2$, and an operating or moving pawl or finger $L^3$, the latter being attached to the minute or center arbor of the clock train and acting to move the ratchet wheel $L'$ one tooth in advance for every revolution of the center arbor and the pawl or finger $L^3$ which is one in each hour.

Mounted on the same stud with the ratchet wheel $L'$ is the barrel $K^7$ having the slotted hub $K^6$ and being held in position by a washer and pin, the washer being slipped over the stud and the pin passing through a hole in the same. Inside of the barrel $K^7$ is a small coiled flat spring $K^8$, one end of which is fastened to a pin $K^9$, and the other end of which is attached to the pin $K^{10}$ on the upper surface of the ratchet wheel $L'$, when the barrel $K^7$ and the ratchet wheel $L'$ are in their working positions. The barrel $K^7$ also is provided with a tooth or projection $K^{11}$ on its circumference which coöperates with the loose pawls $K^{12}$ and $K^{13}$ mounted upon studs on either side of the ratchet wheel $L'$. These pawls bear lightly upon the upper surface of the guide track or ring $K^{14}$ and are provided with pins extending downward far enough to retain the pawls in position inside of the guide track or ring $K^{14}$ attached to the upper surface of the ratchet wheel $L'$. At one point this guide track or ring $K^{14}$ extends outwardly in the form of a loop $K^{15}$ and nearly opposite this outward extension or loop $K^{15}$ in the guide track or ring $K^{14}$ a wedge-shaped piece $K^{16}$ is fastened to the surface of the ratchet wheel $L'$, its office being to alternately deflect one or the other of the pawls $K^{12}$ and $K^{13}$ $K^{13}$ of the guide track or ring $K^{14}$ every twelve revolutions of the center arbor of the clock train.

The operation of the meridian or a. m.—p. m. changing device is as follows:—The ratchet wheel $L'$ is advanced one step for every revolution of the center arbor of the clock train by means of the pawl or finger $L^3$ attached to the said center arbor as before mentioned, and one of the pawls $K^{12}$ and $K^{13}$ being in engagement with the tooth or projection $K^{16}$ the barrel $K^7$ remains stationary and as the ratchet wheel $L'$ moves forward as described, the internal spring $K^8$ inside of the barrel $K^7$ is wound until the wedge-shaped plate $K^{16}$ on the ratchet wheel $L'$ comes into contact with the downwardly extending pin of one of the pawls $K^{12}$ and $K^{13}$ and deflecting it into the loop $K^{15}$ of the guide track or ring $K^{14}$, the pawl is thereby thrown out of engagement with the tooth or projection $K^{16}$ on the barrel $K^{17}$, and the latter under stress of the internal spring $K^8$ revolves one-half of a revolution when the tooth or projection $K^{16}$ becomes engaged with the other pawl, the process being repeated every twelve revolutions of the said center arbor of the clock train, or every half a revolution of the ratchet wheel $L'$. From this description it is plain that the legs or projections $K^4$ and $K^5$ of the meridian or a. m.—p. m. printing part K (Figs. 3 and 24) being in engagement with the slot $K^6$ in the hub of the barrel $K^7$, the former will have the position of its printing letters A and P alternately reversed every twelve hours, and on account of the printing platen covering only the letter that happens to be in the inside position, that will be the only one that will be printed.

The second printing part M (Figs. 3, 10 and 11) consists of a rectangular and preferably unitary piece of metal with a straight line and center representing the second hand engraved upon its lower surface in printing form, the inner portion of the line and the center being slightly lower in height than the outer portion of the line (as shown) for a purpose hereinafter explained. The second printing part M is also provided with a shoulder $m'$ into which a small shaft $m^2$ is fitted and by means of the screw $m^3$ the collar $m^4$ connected with the upper end of the spiral spring $m^5$ is fastened to the lower end of the second shaft $m^6$ of the clock C while the collar $m^7$ connected with the lower end of the said spiral spring $m^5$ is attached to the shaft $m^3$ of the second printing part by the screw $m^8$ being screwed through the collar $m^7$ and into the said shaft $m^2$ by any suitable screw operating device which may be inserted through the hole $m^9$ (Fig. 1) in the right hand side of the bed plate F. When in position in the machine, the shaft $m^2$ of the second printing part extends through a guide hole in the bed plate F and the vertical adjustment of the second printing part M of the second shaft $m^6$ of the clock C is such that it is suspended just out of contact with the lower surface of the bed plate F in order that there may be no friction developed between the surfaces of the second printing part M and the bed plate F which if it existed would cause the clock C to keep irregular time or perhaps to stop it altogether.

Figures 21, 22, 28:
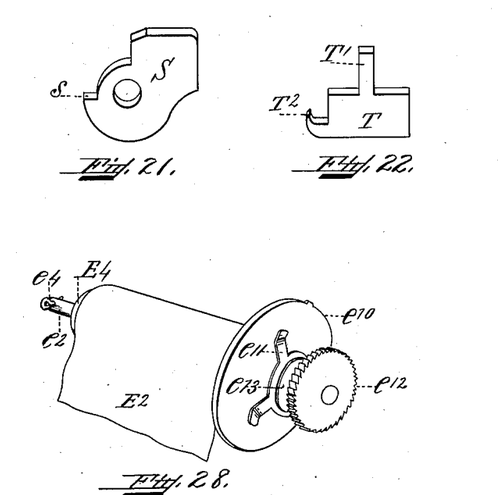
Fig. 21 is a perspective view of the movable cam piece which engages with the auxiliary lever when it and the main operating or imprinting lever or handle are depressed.
Fig. 22 is a perspective view of the supporting or lifting piece which supports the auxiliary plunger or plug and lifts the same when the main operating or imprinting lever or handle and its connected auxiliary lever are depressed.
Fig. 28 is a perspective view of the rear inking ribbon shaft with the inking ribbon and the feeding devices attached thereto.
Figure 29:
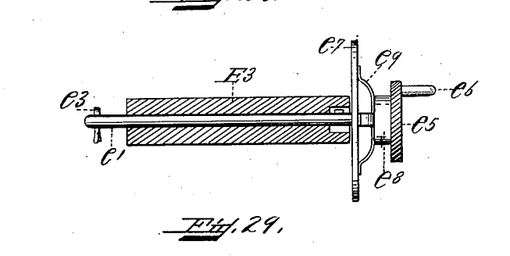
Fig. 29 is a longitudinal section partly in elevation of the front inking ribbon shaft and attached spool or bobbin and the devices for rotating the same.

The case A is further provided with front and rear extensions or casings E, E' (Figs. 1, 2 and 3) circular in shape adapted to receive and support the inking ribbon $E^2$ and its feeding devices. The inking ribbon $E^2$ is wound on wooden spools or bobbins $E^3$ and $E^4$ (Figs. 3, 28 and 29) having hollow interiors to allow the shafts $e'$ and $e^2$ (Figs. 1, 2, 3, 28 and 29) to be passed through them, and each of the shafts $e'$ and $e^2$ are provided with holes near their outer ends adapted to receive split pins or cotters $e^3$ and $e^4$ and with splines or studs (as shown) adapted to fit into corresponding recesses in the ends of the wooden spools or bobbins $E^3$ and $E^4$ to prevent them from turning or slipping upon the shafts $e'$ and $e^2$, as shown in Fig. 29. The front inking ribbon shaft $e'$ is also fitted with a knurled thumb piece $e^5$ having an outwardly extending pin or projection $e^6$, (Figs. 1 and 29) to enable the said front shaft $e'$ to be easily rotated when desired. Upon the said front shaft $e'$ is also mounted the loose circular washer $e^7$ and between it and the shoulder $e^8$ of the thumb piece $e^5$ is placed a loose friction spring washer $e^9$. The rear inking ribbon shaft $e^2$ is likewise fitted with a loose circular washer $e^{10}$ (Figs. 1 and 28) and the loose friction spring washer $e^{11}$, but instead of the knurled thumb piece $e^5$ it is provided with the ratchet wheel $e^{12}$ having the hub $e^{13}$, the friction spring washer $e^{11}$ being placed between the hub $e^{13}$ and the loose circular washer $e^{10}$.

In order to prevent the inking ribbon $E^2$ from dragging over the time printing parts and the other printing surfaces which would be liable to interfere with the proper operation of the clock C, the guide pieces N and N' (Figs. 1, 2 and 3) are attached to the outside of the front and rear inking ribbon chambers E and E' by the screws $n$, $n'$ $n^2$ (Figs. 1, 2, 3) and when the inking ribbon $E^2$ is in position in the machine it passes through the said guide pieces N and N' from the spools or bobbins $E^3$ and $E^4$, and just clear of the printing surfaces the feed shafts $e'$ and $e^2$ extending through the said spools or bobbins $E^3$ and $E^4$ to which they are keyed by the splines or projections as shown in Fig. 29, the said shafts being held in place by the cotters or split pins $e^3$ and $e^4$ bearing against the bosses $n^3$, $n^4$ (Fig. 2) on the outside of the inking ribbon chambers E' and E², the circular washers $e^7$ and $e^{10}$ fitting into the recesses turned in the edges of the open ends of the inking ribbon chambers E and E' and being keyed thereto by the studs $n^5$ and $n^6$ (Fig. 1) on the rims of the said circular washers $e^7$ and $e^{10}$, fitting into corresponding notches in the edges of the said turned recesses, the friction spring washers $e^9$ and $e^{11}$ in conjunction with the cotters or split pins $e^3$ and $e^4$ serving to firmly press the circular washers $e^7$ and $e^{10}$ into the said recesses and at the same time to prevent the shafts $e'$ and $e^2$ from turning too easily. From this it will be seen that when the inking ribbon E² and its attachments are in position in the machine, that the loose circular washers $e^7$ and $e^{10}$ inclose the end of the inking ribbon chambers E and E' while the other ends of the same are an integral part of the case A.

Referring now to the lower portion of the machine,—the base plate B (Figs. 1, 2 and 12) is provided with holes (as shown) through which it may be fastened to a desk or other suitable support by screws, and it has a rectangular aperture or opening O (Figs. 3, 12 and 15) from the four corners of which the four curved arms or spider O', O², O³, O⁴ extend downward and are joined to and support a central piece O⁵, containing a main tubular socket O⁷ (Figs. 1, 3, 4, 5, 12, 13 and 15) the two ears O⁸, O⁹, extending below the said main tubular socket O⁶ serving to support the pivot O¹⁰ upon which the main operating or imprinting lever or handle P turns (Figs. 1, 2, 3, 12, 13 and 15). The imprinting devices are all connected with the base plate B and consist of the platen carrier or frame Q, the platen Q' (Figs. 1, 2, 3, 15, 16, 17, 18), and the main operating or imprinting lever or handle P and its connected auxiliary lever P' together with the auxiliary plunger or plug P² (Figs. 3, 15 and 16) and their co-operating parts (as hereinafter described).

The platen frame or carrier Q consists of a flat rectangular piece of metal having a circular extension or plunger Q² (Figs. 3, 4, 5, 12 and 15) projecting downwardly from its under side adapted to fit into the main tubular socket O⁶ attached to the base plate B. The platen frame or carrier Q is also provided with a rectangular cavity or depression Q³ (Figs. 15 and 18), in its upper surface adapted to receive and hold the platen Q' and to it is attached by means of the screw Q⁴ the slotted standard Q⁵ (Fig. 1) through the upper part of which the curved ratchet pawl R (Fig. 1) is pivoted, and which coöperates with the toothed ratchet wheel $e^{12}$ on the rear inking ribbon feeding shaft $e^2$. The platen frame or carrier Q has also attached to it by means of screws the positioning pieces Q⁶ and Q⁷, (Figs. 1 and 2) and positioning piece Q⁷ is fitted with the trunnions $q^8$ and $q^9$ which carry or support the rod or pivot $q^{10}$ upon which the swinging stop or holding piece $q^{11}$ turns. The platen frame or carrier Q is also provided with the hole $q^{12}$ (Fig. 18) to receive the auxiliary plunger or plug P² and has the guiding or positioning pin $q^{13}$ (Figs. 3, 16 and 18) attached to its under side which extends through a guiding hole in the base plate B, and acts to position the platen frame or carrier Q with relation to the said base plate B.

The main operating or imprinting lever or handle P projects from underneath the machine and is shaped to be conveniently grasped by the operator and it is pivoted very near its inner end of the shouldered pivot O¹⁰ which has its bearings in the two ears O⁸ O⁹, and to prevent it from working sidewise out of its place, a cotter or split pin O¹¹ is put through a hole near its end (Figs. 1, 3, 12, 13, 15 and 15ᵃ). The inner extremity of the main operating or imprinting lever or handle P being always in contact with the lower end of the plunger Q² of the platen frame or carrier Q, the depression of the former acts to elevate the latter, the spiral spring $q^{14}$ (Figs. 3, 5, 12, 13 and 15) attached to the outside of the main tubular socket O⁶ by the screw $q^{15}$ and to the under side of the platen frame or carrier Q by the screw $q^{16}$ acting to bring back the said main operating or imprinting lever or handle P and the said platen frame or carrier Q to their normal positions when the said lever P is released by the operator.

Immediately underneath the main operating or imprinting lever or handle P and held in pivotal connection therewith by means of the small pivot $p$ which passes through the two ears $p'$ and $p^2$ formed on the under side of the said main operating or imprinting lever or handle L, and near its outer end is the auxiliary lever P' provided with the rounded hook $p^3$ at its inner end (Figs. 1, 2, 3, 12, 13 and 15) and adapted to be operated by the stem $p^4$ of the press button $p^5$ which extends vertically through a hole in the main operating or imprinting lever or handle P and contacts with the upper side of the short end of the auxiliary lever P' (Figs. 1, 2, 3 and 15) the spiral spring P⁶ acting to restore it to its normal position after it has been released, the stop pin $p^7$ which extends through the stem $p^4$ of the connecting button $p^5$ serving to retain the same in position in the main operating or imprinting lever or handle P. The inner end of the main operating or imprinting lever or handle P is also slotted vertically through the pivot hole P³ (Fig. 15ᵃ) to allow the movable cam piece S (Figs. 3, 4, 5, 15 and 21) to be inserted therein, and to be pivoted together with the main operating or imprinting lever or handle P upon the pivot $O^{10}$, the stop piece or finger $s'$ (Figs. 3, 4, 5, 12, 13 and 15) attached to the bottom of the ear $O^9$ by the screws $s^2$ coöperating with the pin $s^3$ on the lower edge of the said movable cam piece S to limit its downward excursion and to keep it in proper operative position. The movable cam piece S is also provided with an engaging tooth or projection $s$ adapted to be engaged by or abut against the hook end $p^3$ of the auxiliary lever P' when the latter and the main operating or imprinting lever or handle P are both depressed.

The lower end of the main plunger $Q^2$ as shown in Figs. 3, 4, 5 and 18 is slotted to a sufficient depth to receive the loose flat supporting and lifting piece T having an upward projecting part T' and the side projecting tooth or piece $T^2$, and above the slot the main plunger is bored out to receive the small spiral spring which presses down upon the top of the upward projecting part T' of the supporting and lifting piece T and keeps the lower edge of the same in constant contact with the upper edge of the movable cam piece S. The auxiliary plunger or plug $P^2$ is fitted into the small tubular socket $O^7$ which is situated near the large tubular socket $O^6$ occupied by the main plunger $Q^2$, its upper extremity passing through and extending above the depressed platen carrying surface $Q^3$ of the platen frame or carrier Q, and into the hole in the platen, while its lower extremity rests upon the upper edge of the tooth or projecting part $T^2$ of the supporting or lifting piece T and is kept there by the tension of the spiral spring coiled around the upper part of the said auxiliary plunger $P^2$ between the lower surface of the platen frame or carrier Q and the stop pin $T^3$ which passes through the auxiliary plunger $Q^2$.

The upper surfaces of the platen Q' and the auxiliary plunger or plug $Q^2$ are covered with rubber, and the platen Q' is shaped to fit snugly the corresponding cavity or depressed part $Q^3$ of the platen frame or carrier Q and besides it is positioned therein by the dowel pin $Q^4$. It is provided with a hole $Q^5$ to receive the auxiliary plunger or plug $Q^2$ and it also has an oval shaped hole $Q^6$ near one edge extending toward the center to prevent both the letters "A" and "P" on the meridian or a. m.—p. m. printing part from being printed at once, that letter alone being printed which is not in position over the said hole $Q^6$ when the imprint is made. When the main operating or imprinting lever or handle P is depressed and the platen frame or carrier Q is elevated the pawl R engages with a tooth of the ratchet wheel $e^{12}$ on the rear shaft $e^2$ of the inking ribbon feeding device and when the said main operating or imprinting lever or handle P is retracted, the inking ribbon $E^2$ is moved or fed forward slightly, and when the inking ribbon $E^2$ by repeated engagements of the pawl R and the ratchet wheel $e^{12}$ has been moved or fed, its entire length—it may be turned back or rewound upon the front feeding spool or bobbin $E^3$ by means of the knurled thumb piece $e^5$ or the pin or projection $e^6$ attached thereto.

Figures 15, 15A, 16, 17, 18, 19, 20:
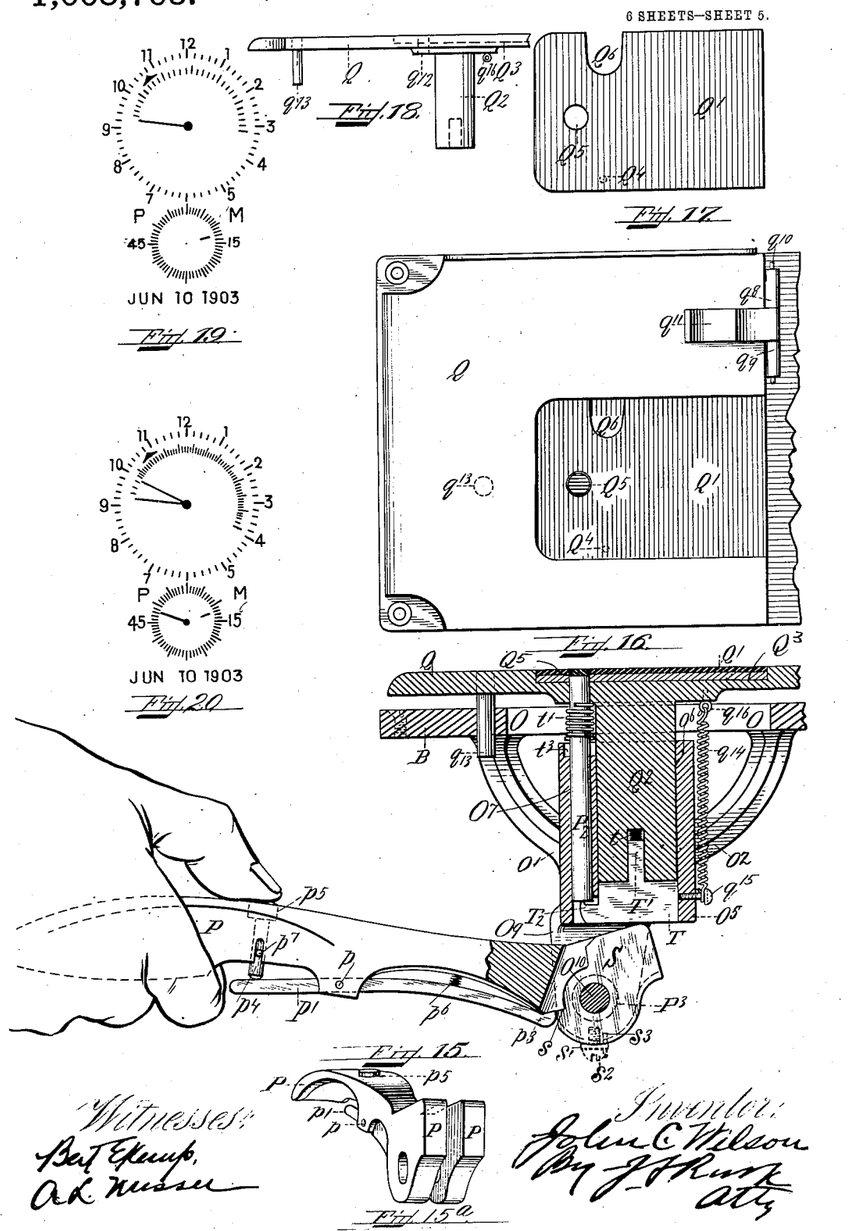
Fig. 15 is a longitudinal vertical section showing part of the base plate of the machine, the platen frame or carrier, the platen and the auxiliary plunger or plug being in the elevated or printing position, the operating or imprinting lever or handle and the auxiliary imprinting lever both being shown in the depressed position.
Fig. 16 is a partial plan view of the upper side of the platen frame or carrier with the platen and the positioning devices and the base plate underneath.
Fig. 17 is a plan view of the platen.
Fig. 18 is a side elevation of the platen frame or carrier showing the plunger or circular extension with its slotted end and the positioning pin both extending downward from its under side together with the screw eye underneath, the cavity or depression on top to receive the platen being outlined by the dotted lines.
Fig. 19 is a facsimile of an initial imprint made by the machine, showing the hour, minute and second and the initial time limit or period of one minute.
Fig. 20 is a facsimile of two superimposed imprints made by the machine showing the actual hour, minute, second and date of the two imprints, and the number of minutes and seconds elapsing or intervening between the making of the two imprints.

The operation of the machine is as follows:—In taking the initial imprint, a card or piece of paper being placed upon the surface of the platen carrier or frame Q under the swinging stop or holding piece $q^{11}$ which holds the card or piece of paper in position, and with one side and end against the positioning piece $Q^6$, $Q^7$ the operator depresses the main operating or imprinting lever or handle P without pressing the auxiliary lever press button $p^5$, and the inner end of the main operating lever or handle P lifts the main plunger $Q^2$ of the platen frame or carrier Q and its attached platen Q' but the movable cam piece S not being in engagement with or abutting against the curved hook end $p^3$ of the auxiliary lever P', the pressure of the auxiliary plunger or plug $P^2$ and the spring $t'$ on the supporting and lifting piece T as the main operating lever or handle P is depressed causes the latter and the auxiliary plunger or plug $P^2$ to remain stationary, the movable cam piece S moving downward and carrying its tooth or projection $s$ away from the curved hook end $p^3$ of the auxiliary lever P, the main plunger $Q^2$ and the platen frame or carrier Q and the platen Q' moving away from the auxiliary plunger or plug $P^2$ leaving the hole $Q^5$ in the platen Q' immediately opposite the central portion of the second printing part or hand M unfilled when the imprinting is done, the result being that the central portion of the second printing part or hand M is not printed and only the impression from the outer part appears in the resultant imprint of 10 h. 46 m. 13 s. p. m. June 10 1903 (as shown in Figs. 19 and 20) the imprinted triangle or arrowhead pointing to the hour, and approximate minute, and the imprinted minute hand pointing to the exact minute on the printed clock dial, the imprinted series of graduations extending from the imprinted minute hand halfway around the circle of the clock dial being of no significance in the initial imprint. The graduated second dial is also imprinted together with the outer end of the second hand pointing to the exact second, and the meridian indicating letters P and M and the date. To take a second imprint—the operator takes the card or paper bearing the initial imprint as shown in Fig. 19, and after placing it in the same position that it occupied before taking the initial imprint, the press button $p^5$ of the auxiliary lever P' is first pressed downward which places the curved hook end $p^3$ of the said auxiliary lever P' in such a position relatively to the movable cam piece S that the depression of the main operating or imprinting lever or handle P causes the said curved hook end $p^3$ of the auxiliary lever P' to be engaged by or abut against the tooth or projection $s$ on the movable cam piece S causing the upper edge of the latter to be carried upward coincidentally with the inner end of the main operating or imprinting lever P and forces the impinging, supporting and lifting piece T and the auxiliary plunger $P^2$ upward, the upper end of the latter filling up the hole $Q^5$ in the platen Q' and making its surface continuous, the result being that not only the outer end is printed as in the initial imprint (shown in Fig. 19) but the entire second hand is printed as shown in Fig. 20, the time recorded being 10 h. 48 m. 49 s.

As before stated, the second printing part M is normally suspended by the spiral spring $m^5$ out of contact with the bed-plate F, but when it is being imprinted it is forced against the lower surface of the bed plate F by the platen Q' and the clock then winds up the spiral spring $m^5$ and when the platen Q is retracted, the said spiral spring $m^5$ uncoils to its former position, the result being that the rate of the clock train remains undisturbed by the stopping of the second printing part while it is being imprinted.

It will be observed that both imprints were made in the same place upon the same card or paper (Fig. 20) or in other words, that the two imprints were superimposed or printed one over the other, and that in the case of the stationary printing parts, the superimposition was exact, while in the case of the revolving printing parts, so far as the hour indicating arrowhead or triangle is concerned, the time elapsing between the two imprints was so short that they appeared to be also exactly superimposed. In the case of the minute printing and calculating part however, the extent of the superimposition of the two imprints or the relative overlapping of the two imprints, or in other words, the difference in phase between the two imprints, records and indicates the number of minutes and fractions of a minute, that have elapsed or intervened between the two imprints which in this instance is two and one half minutes, as shown by the imprint of the minute printing and computing part J.

When it is necessary to determine the elapsed or intervening time between two imprints to the exact second, the number of printed graduations on the second dial imprint intervening between the initial or abbreviated imprint, and the final or complete imprint of the second hand when taken together with the number of minutes indicated by the minute printing and computing part, as having elapsed or intervened will indicate the time elapsing or intervening between the two successive imprints to the exact second, or as shown in Fig. 20, 3 minutes 36 seconds.

When the time elapsing or intervening between two imprints is less than a minute, the record made is illustrated in Fig. 20, where 36 seconds is recorded as having elapsed or intervened between the making of the first and second imprint. It is obvious that in cases where the elapsing or intervening interval of time is an even minute or a multiple thereof, that the two imprints of the second printing part or hand would be superimposed, the result being in such a case that only the imprint of the complete second hand would appear in connection with the imprinted second dial.

If the printing surface of the second printing part were of the same height, the tension of the inking ribbon would be apt to cause a complete imprint of the second hand to be made whether the auxiliary plunger was in the elevated or imprinting position, or otherwise, and to obviate this difficulty, as before mentioned, the central portion of the second printing part or hand is engraven slightly lower than the outer portion and the surface of the auxiliary plunger when in the imprinting position is a little higher than the surface of the platen, the result of the arrangement being (as shown) that the outer portion of the second printing part or hand only is printed when the auxiliary plunger is in its normal or unelevated position and that both the central and the outer portion are simultaneously printed when the said auxiliary plunger is in its elevated position.

It is customary in the administration of telephone toll lines to allow an initial period of time or a time limit of one, two, three or five minutes to the customer during which the toll line may be used with an additional charge. It is advantageous to have the printed time record indicate at a glance whether or not the initial time limit or period has been exceeded. In this invention, this is accomplished by leaving a space or vacancy indicating the time value of the desired initial time period or limit between the pointer mark or index and the initial graduation on the minute printing and computing part, the result being that when the elapsed or intervening time between the first and second imprints is less than this limit, the two successive imprints of the minute printing hand or pointer will point into the vacant space appearing in the imprint between the imprints of the minute printing hand or pointer and the first graduation mark. As shown in Figs. 19 and 30, the initial time limit is one minute, but it is evident that it could be made any required number of minutes by simply varying the width of the space between the pointer mark or index and the first graduation on the minute printing and computing part to correspond with the initial time period or time limit required.

In Fig. 30 one imprint of the printing die J (Fig. 9) prints the index (like the hand of a clock) and the semi-circular series of graduations. It will be noted that the index is separated transversely by some distance from the nearest graduation of the semi-circular uniform series. The blank space separating these imprints represents or corresponds to a time limit interval. When a second imprint is superposed upon the initial imprint of the index graduations the second index imprint may point to said blank space if the time elapsing between the initial and superposed imprints is less than that represented by the blank space. On the other hand, the superposed index imprint may point to one of the graduations if time has elapsed greater than that represented by the blank space. Thus, by the means exemplified by the spaced relation of the index and the nearest graduation, applicant provides means for readily ascertaining at a glance by the appearance of the imprints whether the time elapsing between initial and superposed imprints has exceeded a given limit represented by said blank space. For instance, the semi-circular series in Fig. 30 is graduated in minutes, and the space between the index and the nearest graduation corresponds to a minute space. This minute space represents a time limit interval of one minute; and the operator, for instance, the telephone operator, can readily ascertain after superposing an imprint whether the time limit has exceeded the one minute, by simply noting whether or not the seconds or superposed index imprint points to or beyond the blank space between the initial index and graduation imprints.

I do not limit myself to the arrangement and construction shown as the same may be varied without departing from the spirit of my invention.

Having thus described the nature of my invention, and set forth a construction embodying the same, what I claim as new and desire to secure by Letters Patent of the United States is:—

1. In a machine for printing or recording the time of day, and computing and recording or indicating the time elapsing or intervening between successive imprints, a stationary clock dial printing die, a time printing and computing part adapted to print a representation of a clock hand or pointer to coöperate with the imprint from the said clock dial printing die and indicate the time of day combined with a series of printing marks or graduations extending over part of the circumference of the said time printing and computing part, and a positioning device to enable successive imprints from the said time printing and computing part to be superimposed, the extent or degree of the superimposition of the said successive imprints from the said time printing and computing part indicating and recording the time elapsing or intervening between the said successive imprints.

2. In a machine for printing or recording the time of day, and computing and recording or indicating the time elapsing or intervening between successive imprints, a stationary clock dial printing die, a rotatable time printing and computing part adapted to print a representation of a clock hand or pointer to coöperate with the imprint from the said clock dial printing die and indicate the time of day combined with a series of printing marks or graduations extending over part of the circumference of the said rotatable time printing and computing part, and a positioning device to enable successive imprints, from the said rotatable time printing and computing part to be superimposed, the extent or degree of the superimposition of the said successive imprints from the said rotatable time printing and computing part indicating and recording the time elapsing or intervening between the said successive imprints.

3. In a machine for printing or recording the time of day, and computing and recording or indicating the time elapsing or intervening between successive imprints, a stationary clock dial printing die, a time printing and computing part adapted to print a representation of a clock hand or pointer to coöperate with the imprint from the said clock dial printing die and indicate the time of day combined with an imprinting platen, a series of printing marks or graduations extending over part of the circumference of the said time printing and computing part, a positioning device to enable successive imprints from the said time printing and computing part to be superimposed, the extent or degree of the superimposition of the said successive imprints from the said time printing and computing part indicating and recording the time elapsing or intervening between the successive imprints.

4. In a machine for printing or recording the time of day, and computing and recording or indicating the time elapsing or intervening between successive imprints, a stationary clock dial printing die, a rotatable time printing and computing part actuated to a pre-determined rate of rotation by a clock time train, and adapted to print a representation of a clock hand or pointer to coöperate with the imprint from the said clock dial printing die and indicate the time of day combined with a series of printing marks or graduations extending over part of the circumference of the said rotatable time printing and computing part, and a positioning device to enable successive imprints from the said rotatable time printing and computing part to be superimposed, the extent or degree of the superimposition of the said successive imprints from the said rotatable time printing and computing part indicating and recording the time elapsing or intervening between successive imprints.

5. In a machine for printing or recording the time of day, and computing and recording or indicating the time elapsing or intervening between successive imprints, a stationary clock dial printing die, a rotatable time printing and computing part actuated to a predetermined rate of rotation by a clock time train, and adapted to print a representation of a clock hand or pointer to coöperate with the imprint from the said clock dial printing die and indicating the time of day, combined with an imprinting platen, a series of printing marks or graduations extending over part of the circumference of the said rotatable time printing and computing part, and a positioning device to enable successive imprints from the said rotatable time printing and computing part to be superimposed, the extent or degree of the superimposition of the said successive imprints of the said rotatable time printing and computing part indicating or recording the time elapsing or intervening between the said successive imprints.

6. In a machine for printing or recording the time of day, and computing and recording the time elapsing or intervening between successive imprints, a stationary clock dial printing die, an hour hand printing part coöperating with said clock dial printing die, a minute printing and computing part adapted to print a representation of a minute hand or pointer to coöperate with the imprint from the said clock dial printing die combined with a series of marks or graduations extending over a part of the circumference of the said minute printing and computing part, and a positioning device to enable successive imprints to be superimposed, the time of day being conjointly imprinted by the said clock dial printing die, the said hour printing part and the said representation of a minute hand or pointer on the minute and computing part, and the elapsing or intervening time between successive imprints being computed and recorded or indicated by the extent or degree of the superimposition of the said successive imprints from the said series of marks or graduations, extending over a part of the circumference of the said minute printing and computing part.

7. In a machine for printing or recording the time of day, and computing and recording or indicating the time elapsing or intervening between successive imprints, a stationary clock dial printing die, an hour hand printing part coöperating with the said clock dial printing die, a minute printing and computing part adapted to print a representation of a minute hand or pointer to coöperate with the imprint of the said clock dial printing die combined with an imprinting platen, a series of marks or graduations extending over a part of the circumference of the said minute printing and computing part, and a positioning device to enable successive imprints to be superimposed, the time of day being conjointly imprinted by the said clock dial printing die, the said hour printing part and the said representation of a minute hand or pointer on the said minute printing and computing part and the elapsing or intervening time between successive imprints being computed and recorded or indicated by the extent or degree of the superimposition of the said successive imprints from the said series of marks or graduations extending over a part of the circumference of the said minute printing and computing part.

8. In a machine for printing or recording the time of day, and computing and recording or indicating the time elapsing or intervening between successive imprints, a stationary clock dial printing die, an hour hand printing part actuated to predetermined rotation by a clock time train and coöperating with the said clock dial printing die, a minute printing and computing part actuated to a predetermined rotation by a clock time train and adapted to print a representation of a minute hand or pointer to coöperate with the imprint of the said clock dial printing die combined with a series of marks or graduations extending over a part of the circumference of said minute printing and computing part, and a positioning device to enable successive imprints to be superimposed, the time of day being conjointly imprinted by the said clock dial printing die, the said hour printing part, the said representation of a minute hand or pointer on the said minute printing and computing part, and the elapsing or intervening time between successive imprints being computed and recorded or indicated by the extent or degree of the superimposition of the said successive imprints from the said series of marks or graduations extending over a part of the circumference of the said minute printing and computing part.

9. In a machine for printing or recording the time of day, and computing and printing or recording the time elapsing or intervening between successive imprints, a stationary clock dial printing die, a graduated seconds dial printing die, an hour hand printing part, a minute printing and computing part adapted to print a representation of a minute hand or pointer, a seconds printing part adapted to print a representation of a seconds hand or pointer, the said hour and minute printing parts coöperating with the said clock dial printing die and the said seconds printing part coöperating with the said graduated seconds dial printing die combined with an actuated clock time train for said hour, minute and seconds printing parts, a series of marks or graduations extending over a part of the circumference of the said minute printing and computing part, and a positioning device to enable successive imprints to be superimposed, the time of day being conjointly imprinted by the said clock dial printing die, the said hour printing part, the said representation of a minute hand or pointer on the said minute printing and computing parts and the said graduated seconds dial printing die and the said seconds hand printing part, and the elapsing or intervening time between successive imprints being computed and recorded or indicated by the extent or degree of the superimposition of the said successive imprints from the said series of marks or graduations extending over a part of the circumference of the said minute printing and computing part.

10. In a machine for printing or recording the time of day, and computing and printing or recording the time elapsing or intervening between successive imprints, a stationary clock dial printing die, and a graduated seconds dial printing die, an hour hand printing part, a minute printing and computing part adapted to print a representation of a minute hand or pointer, a second printing part adapted to print a representation of a seconds hand or pointer, the said hour and minute printing parts coöperating with the said clock dial printing die and the said second printing part coöperating with the said graduated dial printing die combined with an imprinting platen, an actuating clock time train for the said hour, minute and seconds printing parts, a series of marks or graduations extending over a part of the circumference of the said minute printing and computing part, and a positioning device to enable successive imprints to be superimposed, the time of day being conjointly imprinted by the said clock dial printing die, the said hour printing part, the said representation of a minute hand or pointer on the said minute printing and computing part and the said graduated seconds dial printing die and the said seconds hand printing part, and the elapsing or intervening time between successive imprints being computed and recorded or indicated by the extent or degree of the superimposition of the said successive imprints from the said series of marks or graduations extending over a part of the circumference of the said minute printing and computing part.

11. In a time printing machine, a printing hand or pointer rotated by a clock time train to indicate time, an imprinting platen coöperating therewith, the part of the said imprinting platen opposite to a portion of the said printing hand or pointer being provided with an auxiliary plunger or plug, the surface of which when co-incident with the surface of the said imprinting platen allows the whole of the said printing hand or pointer to be printed and when the surface of the said movable plunger or plug is withdrawn below the surface of the said imprinting platen permitting only a portion of the said printing hand or pointer to be imprinted, combined with means for controlling the relative positions of the surfaces of the said imprinting platen and the said auxiliary plunger or plug.

12. In a time printing machine, a printing hand or pointer rotated by a clock train to indicate time, an imprinting platen coöperating therewith, the part of the said imprinting platen opposite to a portion of the said printing hand or pointer being provided with a reciprocating auxiliary plunger or plug, the surface of which when co-incident with the surface of the said printing platen allows the whole of the said printing hand or pointer to be imprinted, and when the surface of the said reciprocating auxiliary plunger or plug is withdrawn below the surface of the said imprinting platen permitting only a portion of the said printing hand or pointer to be imprinted, combined with a lever or handle to control the position of the said reciprocating auxiliary plunger or plug.

13. In a time printing machine, a stationary dial printing die, a printing hand or pointer rotated by a clock time train in juxtaposition therewith to indicate time, an imprinting platen coöperating with the said stationary dial printing die and the said printing hand or pointer, the part of the said imprinting platen opposite to a portion of the said printing hand or pointer being provided with a vertically movable auxiliary plunger or plug, the surface of which when co-incident with the surface of the said imprinting platen allows the said dial printing die and the whole of the said printing hand or pointer to be imprinted, and when the surface of the said vertically movable auxiliary plunger or plug is withdrawn below the surface of the said imprinting platen permitting only a portion of said hand or pointer and the whole of the said dial printing die to be imprinted, combined with means for moving the said auxiliary plunger or plug vertically with relation to the said imprinting platen.

14. In a time printing machine, a stationary dial printing die, a printing hand or pointer rotated by a clock train in juxtaposition therewith to indicate time, an imprinting platen coöperating with the said stationary dial printing die and the said printing hand or pointer, the part of the said imprinting platen opposite to a portion of the said printing hand or pointer being provided with a vertically movable auxiliary plunger or plug the surface of which when co-incident with the surface of the said imprinting platen allows the said dial printing die and the whole of the said printing hand or pointer to be imprinted and when the surface of the said vertically movable auxiliary plunger or plug is withdrawn below the surface of the said imprinting platen permitting only a portion of the said printing hand or pointer and the whole of the said dial printing die to be imprinted combined with a lever or handle to control the position of the said vertically movable plunger or plug.

15. In a time printing machine, a printing hand or pointer rotated by a clock train, an imprinting platen coöperating therewith, the part of the said imprinting platen opposite to a portion of the said printing hand or pointer being provided with a movable auxiliary plunger or plug, a main operating or imprinting lever or handle for actuating the said imprinting platen, an auxiliary lever connected with the said main operating or imprinting lever or handle, intermediate lifting mechanism for the said movable auxiliary plunger or plug between the said auxiliary lever and the said movable auxiliary plunger or plug, and means for moving the said auxiliary lever into and out of operative engagement with the said intermediate lifting mechanism to control or determine the position of the said movable auxiliary plunger or plug with relation to the imprinting platen when an imprint is being made.

16. In a time printing machine, a stationary dial printing die, a printing hand or pointer rotated by a clock time train in coöperative juxtaposition therewith, an imprinting platen for taking an imprint from the said stationary dial printing die and the said printing hand or pointer, the said imprinting platen being provided with a vertically auxiliary movable plunger or plug, the surface of which when coincident with the surface of the said imprinting platen allows the said stationary dial printing die and the whole of the said printing hand or pointer to be imprinted, and when the surface of the said vertically movable auxiliary plunger or plug is withdrawn below the surface of the said imprinting platen permitting only a portion of the said printing hand or pointer and the whole of the said dial printing die to be imprinted, combined with a main operating or imprinting lever or handle to actuate the said imprinting platen, an auxiliary lever connected with the said main operating or imprinting lever or handle, intermediate lifting mechanism for the said vertically movable auxiliary plunger or plug, and means for moving the said auxiliary lever into and out of operative engagement with the said intermediate mechanism to thereby control or determine the position of the surface of the said auxiliary plunger or plug relative to the surface of the said imprinting platen at the time an imprint is being made.

17. In a time printing machine, the combination of a supporting base plate provided with a tubular socket underneath; a platen; a platen carrier having a plunger extending downward through said tubular socket and supporting the platen; an operating lever pivoted under the supporting base plate and engaging the plunger to move the platen to imprinting position; a removable case extending above the base plate and secured thereto; and a time clock train and coöperating printing parts supported in and removable with said removable case.

18. In a time printing machine, a supporting base plate provided with a tubular socket, a platen frame or carrier carrying and supporting an imprinting platen and a pivoted ratchet pawl and having a circular extension or plunger extending downward through the said tubular socket, an operating or imprinting lever or handle pivoted beneath the said supporting base plate and extending outwardly therefrom and coöperating with the said circular extension or plunger to lift the said platen frame or carrier and the said imprinting platen into the imprinting position, combined with a removable case extending above the said supporting base plate and fastened thereto, the said case having front and rear extensions or chambers inclosing and supporting the inking ribbon and its front and rear moving or feeding shafts, the said rear moving or feeding shaft having a ratchet wheel affixed thereto and the said pivoted ratchet pawl carried by the said platen frame or carrier engaging with the said ratchet wheel on the said rear moving or feeding inking ribbon shaft when the said platen frame or carrier and the said imprinting platen is lifted to the imprinting position by the said operating or imprinting lever or handle, the said ratchet wheel and the said rear inking ribbon, moving or feeding shaft and the inking ribbon being moved or turned while the said imprinting platen, the said platen frame or carrier and the said ratchet pawl are moving downward.

19. In a time printing machine, the combination of a supporting base plate; a removable case above the base plate and secured thereto; a clock time train with coöperating printing parts supported by and removable with said removable case; an operating handle; a movable platen frame between the base plate and the removable case in operative relation to the operating handle; and a work supporting platform on the platen frame extending outwardly beyond the printing parts and provided with positioning means to position the work to be imprinted.

20. In a machine for printing or recording the time of day, and computing and recording or indicating the time elapsing or intervening between successive imprints, a stationary clock dial printing die, a time printing and computing part adapted to print a representation of a clock hand or pointer to coöperate with the imprint from the said clock dial printing die and indicate the time of day combined with one or more printing marks or graduations extending over part of the circumference of the said time-printing and computing part, and a positioning device to enable successive imprints from the said time printing and computing part to be superimposed, the extent or degree of the superimposition of the said successive imprints from the said time printing and computing part indicating and recording the time elapsing or intervening between the said successive imprints.

21. In a machine for printing or recording the time of day and indicating elapsed time between successive imprints, the combination of a stationary dial printing die; a printing and computing part in juxtaposition thereto adapted to be rotated by a clock time train; a plurality of printing marks or time graduations disposed in a parti-circular line on said printing and computing part; means to print simultaneously from the dial die and the printing and computing part; and positioning means to enable successive imprints from the printing and computing part to be superposed, the degree of superimposition of the successive imprints from the printing and computing part indicating elapsed time between said imprints.

22. In a time printing machine, the combination of a clock-driven unitary printing part to indicate time; a platen to coöperate therewith; an auxiliary plunger mounted in said platen and at times supplying part of the working face of the platen opposite to a portion of said printing part; and provision for operating the platen and said plunger together or separately, to print from all or only a portion of said printing part.

23. In a time printing mechanism, the combination of die means comprising a dial and an index character; and means for imprinting alternatively said entire index character or only a part thereof.

24. In a time printing mechanism, an imprinting die having an elongated index character thereon in combination with platen means for varying the amount of the character imprinted.

25. In a time printing mechanism, the combination of an imprinting die having an index character thereon and differential platen means for varying the amount of the character imprinted.

26. In a time printing mechanism, the combination of dial printing means; pointer printing means; and means for making successive imprints of the pointer including means to differentiate the appearance of one such pointer imprint from the appearance of another such pointer imprint.

27. In a time printing mechanism, the combination of die means including a dial and a pointer, a differential platen coöperating therewith, and handle actuated means for effecting imprinting operations, said handle having means alternatively to render the entire platen or only a part thereof effective in making imprints.

28. In a time printing mechanism, the combination of stationary dial printing means; clock-driven index printing means; provision for making imprints by said index means to indicate difference in time phase; and means to differentiate the appearance of index imprints of different phase.

29. In a time printing mechanism, the combination of dial printing means; index printing means; provision for making imprints of different time phase by said index means; means for printing graduations between index imprints of different phase, and means to distinguish between the appearance of imprints of different phases, whereby the intervening graduations indicate elapsed time.

In testimony whereof, I have signed my name to this specification in the presence of two subscribing witnesses, this 5th day of September A. D. 1903.

JOHN C. WILSON.

Witnesses:
A. R. LARRABEE,
A. L. NUSSER.